(12) United States Patent
Kaneko et al.

(10) Patent No.: US 7,874,002 B2
(45) Date of Patent: Jan. 18, 2011

(54) METHOD OF CONNECTION OF EQUIPMENT IN A NETWORK AND NETWORK SYSTEM USING SAME

(75) Inventors: Takashi Kaneko, Yokohama (JP); Tadaaki Tanaka, Yokohama (JP); Hiroki Takayama, Kawasaki (JP); Tadahiro Ohta, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1210 days.

(21) Appl. No.: 11/212,191

(22) Filed: Aug. 26, 2005

(65) Prior Publication Data

US 2006/0021043 A1 Jan. 26, 2006

Related U.S. Application Data

(63) Continuation of application No. PCT/JP03/07842, filed on Jun. 20, 2003.

(51) Int. Cl.
*G06F 12/14* (2006.01)
*G06F 12/16* (2006.01)

(52) U.S. Cl. .............................. 726/24; 726/22; 726/23

(58) Field of Classification Search ....................... None
See application file for complete search history.

(56) References Cited

U.S. PATENT DOCUMENTS 7,555,774 B2 * 6/2009 Hall et al. ..................... 726/22

2002/0146002 A1 10/2002 Sato
2002/0199116 A1 * 12/2002 Hoene et al. ................. 713/201

FOREIGN PATENT DOCUMENTS

| JP | 11-073384 | 3/1999 |
|---|---|---|
| JP | 2002-314573 | 10/2002 |
| JP | 2002-366522 | 12/2002 |

OTHER PUBLICATIONS

International Search Report dated Aug. 19, 2003.
Hiroshi Suzuki. Virus Check Service for Use in Remote Maintenance. Japan Institute of Invention and Innovation Technical Report, Journal of Technical Disclosure No. 95-14045, Oct. 2, 1995.

* cited by examiner

*Primary Examiner*—Kaveh Abrishamkar
(74) *Attorney, Agent, or Firm*—Katten Muchin Rosenman LLP

(57) ABSTRACT

A method for connecting equipment in a network system, enabling prevention of the spread of viruses throughout the network resulting from connection to the network of a server, client, PC, or other equipment infected with a virus, in which the network configuration is separated into an operation network and a virus check network using VLAN (Virtual Local Area Network) functions, and at the time of connection of equipment, a virus check is performed in the virus check network, and equipment confirmed by the virus check to be safe is accommodated in the operation network. When safety cannot be confirmed through the virus check, the equipment is isolated from the operation network and from the virus network.

7 Claims, 17 Drawing Sheets

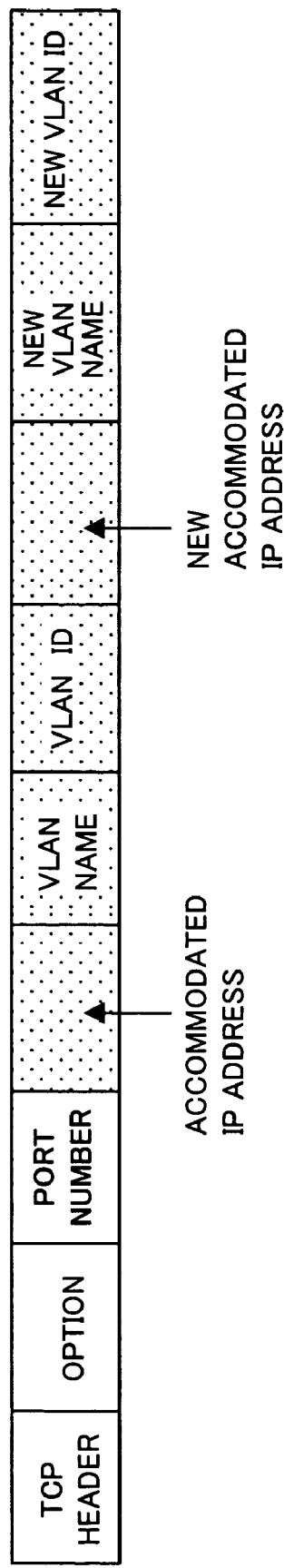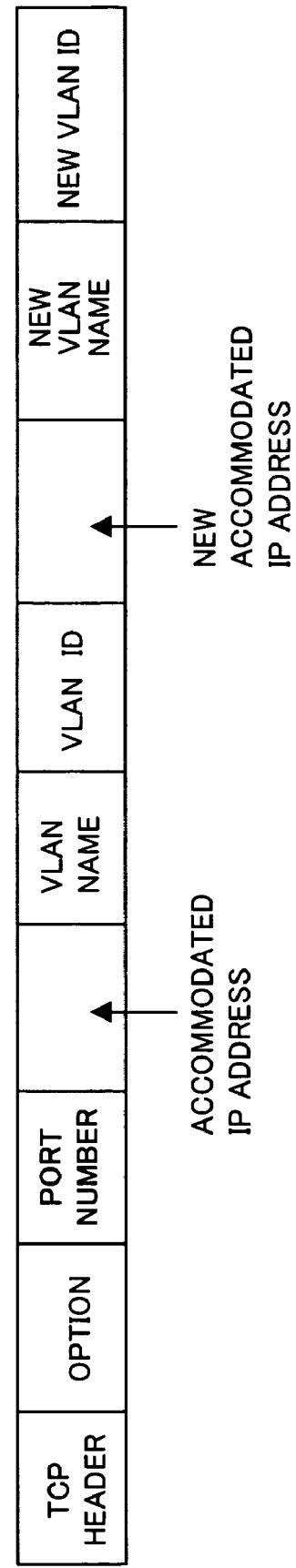

Fig. 9A

| PORT NUMBER | VLAN NAME | VLAN ID | ACCOMMODATED IP ADDRESS |
|---|---|---|---|
| 1 | LAN1 | 100 | 192.168.100.1/24 |
| 2 | LAN1 | 100 | 192.168.100.1/24 |
| 3 | LAN1 | 100 | 192.168.100.1/24 |
| .. | .. | .. | .. |
| 10 | LAN1 | 100 | 192.168.100.1/24 |
| 11 | Default | 1 | 192.168.0.1/24 |
| 12 | Default | 1 | 192.168.0.1/24 |
| 13 | Default | 1 | 192.168.0.1/24 |
| .. | .. | .. | .. |
| 16 | Default | 1 | 192.168.0.1/24 |

Fig. 9B

| PORT NUMBER | VLAN NAME | VLAN ID | ACCOMMODATED IP ADDRESS | NEW VLAN NAME | NEW VLAN ID | NEW ACCOMMODATED IP ADDRESS |
|---|---|---|---|---|---|---|
| 1 | LAN1 | 100 | 192.168.100.1/24 | LAN1 | 100 | 192.168.100.1/24 |
| 2 | LAN1 | 100 | 192.168.100.1/24 | LAN1 | 100 | 192.168.100.1/24 |
| 3 | LAN1 | 100 | 192.168.100.1/24 | LAN1 | 100 | 192.168.100.1/24 |
| .. | .. | .. | .. | .. | .. | .. |
| 10 | LAN1 | 100 | 192.168.100.1/24 | LAN1 | 100 | 192.168.100.1/24 |
| 11 | Default | 1 | 192.168.0.1/24 | LAN1 | 100 | 192.168.100.1/24 |
| 12 | Default | 1 | 192.168.0.1/24 | LAN1 | 100 | 192.168.100.1/24 |
| 13 | Default | 1 | 192.168.0.1/24 | LAN1 | 100 | 192.168.100.1/24 |
| .. | .. | .. | .. | .. | .. | .. |
| 16 | Default | 1 | 192.168.0.1/24 | LAN2 | 100 | 192.168.200.1/24 |

Fig.11A

| PORT NUMBER | VLAN NAME | VLAN ID | ACCOMMODATED IP ADDRESS | NOTE |
|---|---|---|---|---|
| 1 | LAN1 | 100 | 192.168.100.1/24 | |
| 2 | LAN1 | 100 | 192.168.100.1/24 | |
| 3 | LAN1 | 100 | 192.168.100.1/24 | |
| .. | .. | .. | .. | |
| 10 | LAN1 | 100 | 192.168.100.1/24 | |
| 11 | Default | 1 | 192.168.0.1/24 | |
| 12 | LAN1 | 100 | 192.168.100.1/24 | INCORPORATED INTO LAN1 |
| 13 | Default | 1 | 192.168.0.1/24 | |
| .. | .. | .. | .. | |
| 16 | Default | 1 | 192.168.0.1/24 | |

Fig.11B

| PORT NUMBER | VLAN NAME | VLAN ID | ACCOMMODATED IP ADDRESS | NEW VLAN NAME | NEW VLAN ID | ACCOMMODATED IP ADDRESS |
|---|---|---|---|---|---|---|
| 1 | LAN1 | 100 | 192.168.100.1/24 | LAN1 | 100 | 192.168.100.1/24 |
| 2 | LAN1 | 100 | 192.168.100.1/24 | LAN1 | 100 | 192.168.100.1/24 |
| 3 | LAN1 | 100 | 192.168.100.1/24 | LAN1 | 100 | 192.168.100.1/24 |
| .. | .. | .. | .. | .. | .. | .. |
| 10 | LAN1 | 100 | 192.168.100.1/24 | LAN1 | 100 | 192.168.100.1/24 |
| 11 | LAN1 | 100 | 192.168.0.1/24 | LAN1 | 100 | 192.168.100.1/24 |
| 12 | LAN1 | 100 | 192.168.100.1/24 | LAN1 | 100 | 192.168.100.1/24 |
| 13 | Default | 1 | 192.168.0.1/24 | LAN1 | 100 | 192.168.100.1/24 |
| .. | .. | .. | .. | .. | .. | .. |
| 16 | Default | 1 | 192.168.0.1/24 | LAN2 | 100 | 192.168.200.1/24 |

Fig.12A

| PORT NUMBER | VLAN NAME | VLAN ID | ACCOMMODATED IP ADDRESS | NOTE |
|---|---|---|---|---|
| 1 | LAN1 | 100 | 192.168.100.1/24 | |
| 2 | LAN1 | 100 | 192.168.100.1/24 | |
| 3 | LAN1 | 100 | 192.168.100.1/24 | |
| .. | .. | .. | .. | |
| 10 | LAN1 | 100 | 192.168.100.1/24 | |
| 11 | Default | 1 | 192.168.0.1/24 | |
| 12 | Quarantine | 4094 | 192.168.255.0/24 | ISOLATED IN QUARANTINE |
| 13 | Default | 1 | 192.168.0.1/24 | |
| .. | .. | .. | .. | |
| 16 | Default | 1 | 192.168.0.1/24 | |

Fig.12B

| PORT NUMBER | VLAN NAME | VLAN ID | ACCOMMODATED IP ADDRESS | NEW VLAN NAME | NEW VLAN ID | ACCOMMODATED IP ADDRESS |
|---|---|---|---|---|---|---|
| 1 | LAN1 | 100 | 192.168.100.1/24 | LAN1 | 100 | 192.168.100.1/24 |
| 2 | LAN1 | 100 | 192.168.100.1/24 | LAN1 | 100 | 192.168.100.1/24 |
| 3 | LAN1 | 100 | 192.168.100.1/24 | LAN1 | 100 | 192.168.100.1/24 |
| .. | .. | .. | .. | .. | .. | .. |
| 10 | LAN1 | 100 | 192.168.100.1/24 | LAN1 | 100 | 192.168.100.1/24 |
| 11 | Default | 1 | 192.168.0.1/24 | LAN1 | 100 | 192.168.100.1/24 |
| 12 | Quarantine | 4049 | 192.168.255.0/24 | LAN1 | 100 | 192.168.100.1/24 |
| 13 | Default | 1 | 192.168.0.1/24 | | | |
| .. | .. | .. | .. | .. | .. | .. |
| 16 | Default | 1 | 192.168.0.1/24 | LAN2 | 100 | 192.168.200.1/24 |

METHOD OF CONNECTION OF EQUIPMENT IN A NETWORK AND NETWORK SYSTEM USING SAME

CROSS-REFERENCE TO RELATED APPLICATIONS

This application is a continuation of international application PCT/JP2003/007842, filed on Jun. 20, 2003.

TECHNICAL FIELD

The present invention relates to a method of connecting equipment to a network, and in particular to a method of connecting the equipment to the network, which addresses computer anti-virus measures, as well as to a network system using such the method.

BACKGROUND ART

The advance into ordinary households of ADSL (Asynchronous Digital Subscriber Line) services of late has been accompanied by an explosive increase in the frequency of computer viruses, and there are an increasing number of cases of serious damage imparted to networks.

The construction of IP (Internet Protocol) networks as communication networks is being studied and implemented. In communication networks of the prior art, dedicated hardware, software and other resources are provided, so that in general computer virus attacks were uncommon.

In contrast, servers used to construct an IP network are general-use machines, and the OS (Operating System) is Windows (a registered trademark of Microsoft Corporation), UNIX or similar, so that there are expected to be plentiful opportunities for a computer virus attack. Measures to counter computer viruses to date have focused primarily on preventing virus intrusion from outside the network.

However, there are a wide variety of computer viruses extant, and in cases in which a terminal (PC) already belonging to a network is infected with a virus, it is entirely possible that the virus may spread abruptly from the time at which the PC is connected to the IP network. The social effects resulting from disruption of the network may be far-reaching.

Similarly in enterprise LANs (Local Area Networks) as well, when a PC within the enterprise which has already been infected by a virus is connected, the virus may spread rapidly throughout the entire enterprise network, and the impact on the enterprise of a network shutdown due to the virus will be considerable.

As technology of the prior art, a technique has been proposed for preventing network propagation of a computer virus by dynamically altering the logical connection with the network and the unconnected state in computers or other information processing terminals connected to the network (see Japanese Patent Laid-open No. 11-73384).

In the invention according to Japanese Patent Laid-open No. 11-73384, a computer which already stores anti-virus functions (for example, a virus check program) is connected to a LAN. The anti-virus function is used with a file inserted into and executed on the computer, to judge whether the file is infected with a virus; when there is a virus infection, file transfer to the LAN is blocked.

However, in the technology of Japanese Patent Laid-open No. 11-73384, a virus check is performed only for a file inserted into a particular computer connected to the LAN. Hence the technology of Japanese Patent Laid-open No. 11-73384 cannot be applied in a mode in which computers belonging to an enterprise LAN or similar are connected to and removed from the LAN as the occasion requires. That is, when a computer is itself already infected with a virus, a measure to block connection to the LAN is not possible.

DISCLOSURE OF THE INVENTION

Hence an object of the invention is to provide a method for connection of equipment to a network which takes such problems into consideration, and a network system using such a method.

In a first aspect of a method for connection of equipment to a network which achieves this object of the invention, VLAN (Virtual Local Area Network) functions are used to separate the network configuration into an operation network and a virus check network; at the time of connection of equipment a virus check is performed in the virus check network, and the equipment, having been confirmed to be safe through the virus check, is then accommodated by the operation network.

A second aspect of a method for connection of equipment to a network which achieves this object of the invention is the first aspect, in which, when confirmation of safety through a virus check is not possible, the equipment is isolated from both the operation network and from the virus check network.

A first aspect of a network system which uses the above method for connection of equipment to a network to achieve the above object has a network connection device comprising a plurality of ports and which employs VLAN (Virtual Local Area Network) functions to separate equipment connected to the plurality of ports into an operation network and a virus check network, and a virus check server connected to the virus check network; when new equipment is connected to an open port of the network connection device, the new equipment is accommodated by the virus check network, a virus check is performed, and if safety is confirmed through the virus check, the equipment is accommodated by the operation network.

A second aspect of a network system which uses the above method for connection of equipment to a network to achieve the above object is the network system of the first aspect, in which, when confirmation of safety through a virus check is not possible, the new equipment is isolated from both the operation network and from the virus check network.

A third aspect of a network system which uses the above method for connection of equipment to a network to achieve the above object is the network system of the first aspect, in which the network connection device has management tables for each of the plurality of ports, and the management tables are updated corresponding to the results of the virus check, to update the settings of the network to accommodate ports to which the new equipment is connected.

A fourth aspect of a network system which uses the above method for connection of equipment to a network to achieve the above object is the network system of the first aspect, in which, when equipment connected to the operation network is removed from the corresponding port, VLAN functions of the network connection device are employed to change the accommodation of the port to the virus check network.

Aspects of the invention will become clearer through the following explanations, referring to the drawings.

BRIEF DESCRIPTION OF THE DRAWINGS

FIG. 8A and FIG. 8B show a packet format for transmission and reception (requests/responses) of VLAN setting information (port numbers, VLAN name, VLAN ID, accommodating IP address);

FIG. 9A shows an example of a management table in the connection device 1 at one point in time;

FIG. 9B shows an example of a management table in a virus monitoring server 2;

FIG. 11A and FIG. 11B shows a management table in a connection device 1 and a management table in a virus monitoring server 2, when there are no problems in the virus check results;

FIG. 12A and FIG. 12B show a management table in a connection device 1 and a management table in a virus monitoring server 2, when there are problems in the virus check results;

BEST MODE FOR CARRYING OUT THE INVENTION

Figure 1:
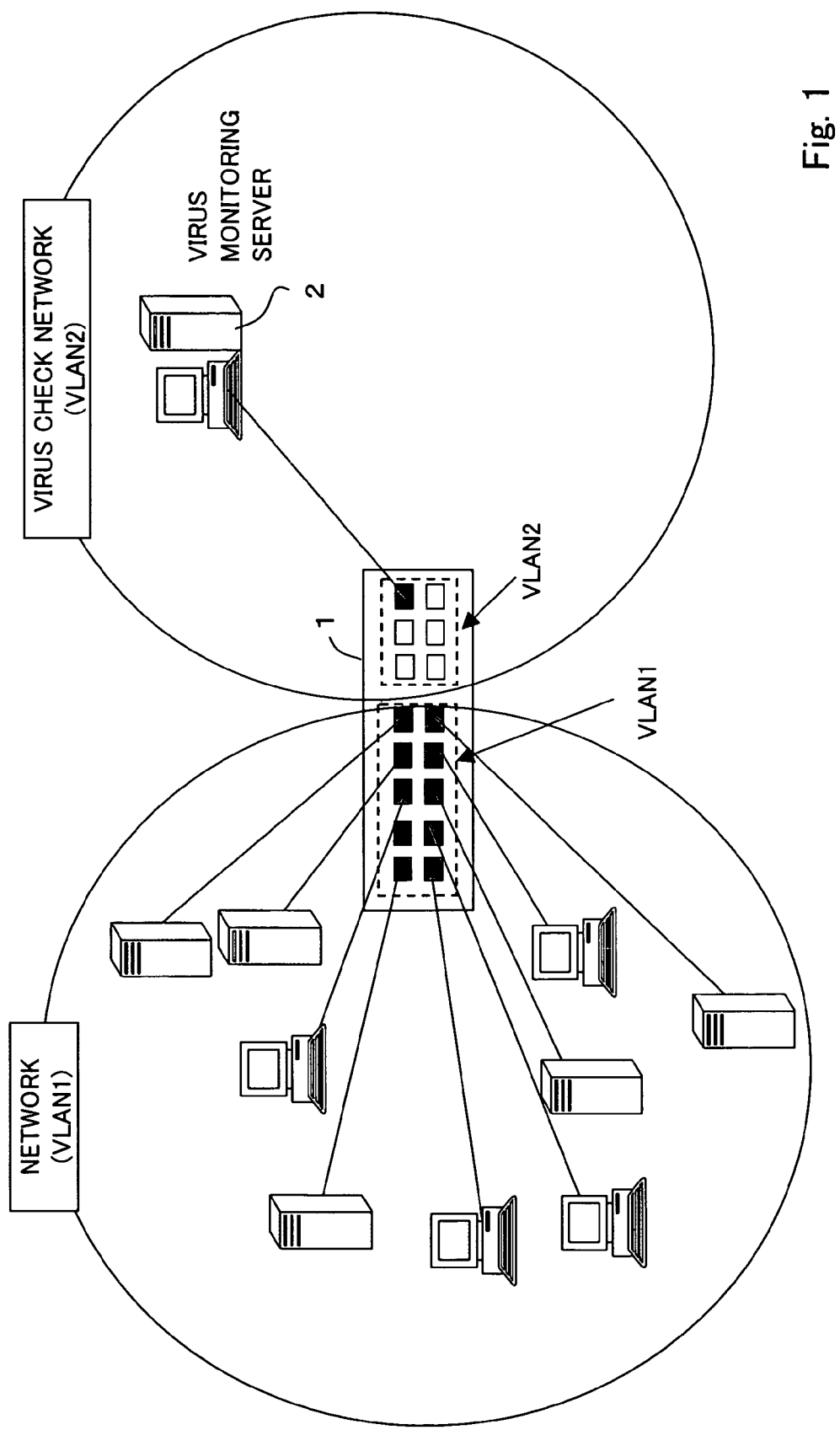
FIG. 1 is a conceptual diagram of a network to which the invention is applied.

Below, aspects of the invention are explained referring to the drawings.

FIG. 1 is a conceptual diagram of a network to which the invention is applied. A network is configured in which, by means of a laser 3 (L3) switch or router, or a layer 2 (L2) switch (switching hub) or other network connection equipment 1, a plurality of computers are connected.

In this invention, a plurality of computers connected to ports are configured as a first network VLAN (Virtual Local Area Network) 1, and as a second VLAN (Virtual Local Area Network) 2 for virus checking, by means of the VLAN (Virtual Local Area Network) functions of the network connection device 1. The network VLAN2 is connected to the virus monitoring server 2.

Figure 6A:
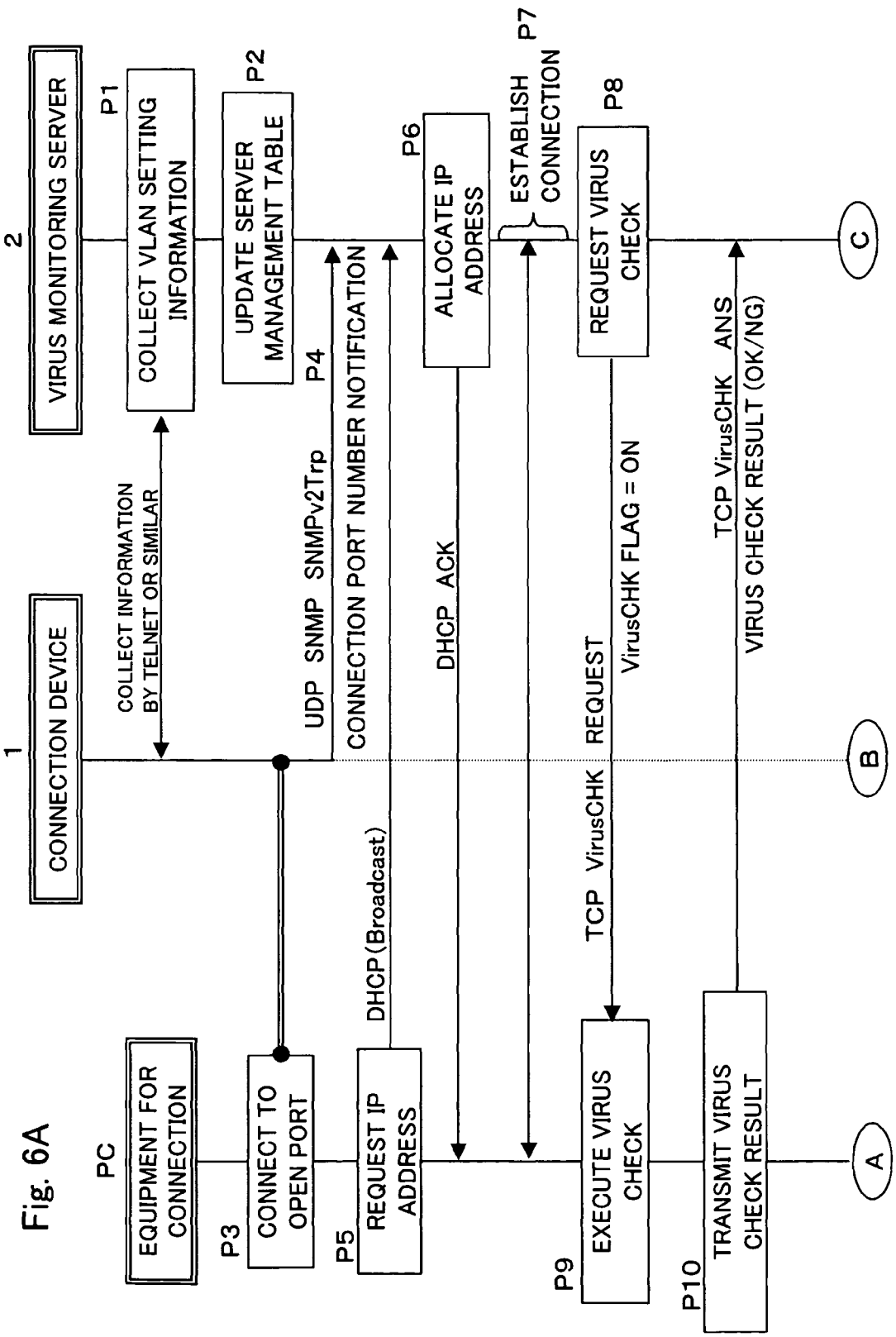
FIG. 6A and FIG. 6B explain a procedure for processing corresponding to FIG. 2 through FIG. 5, as a first aspect.
Figure 6B:
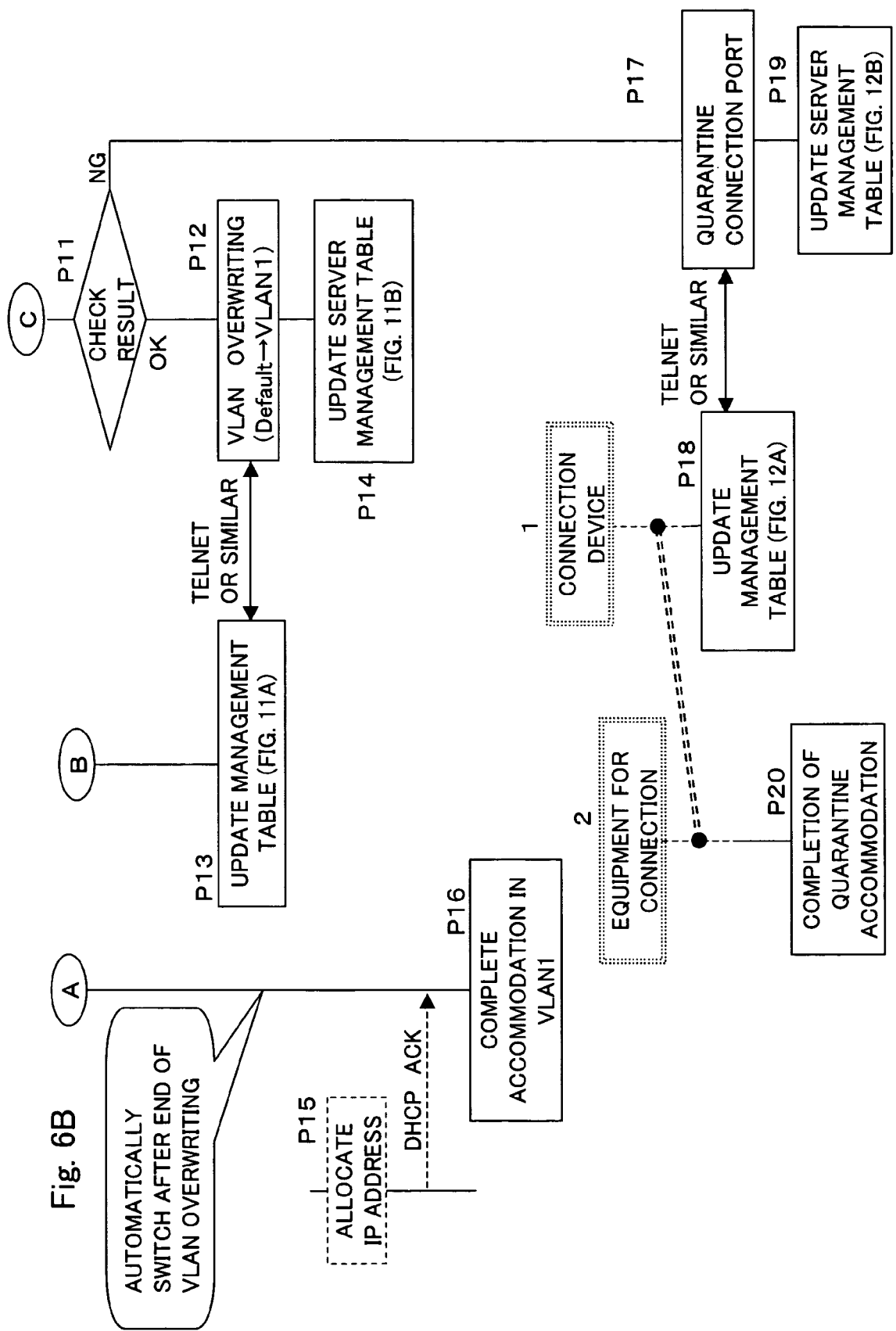

FIG. 2 through FIG. 5 show aspects for cases in which a server, PC or other equipment for connection (hereafter "equipment for connection PC") is newly connected to a network VLAN1. FIG. 6A and FIG. 6B explain a procedure for processing corresponding to FIG. 2 through FIG. 5, as a first aspect.

Figure 7C:
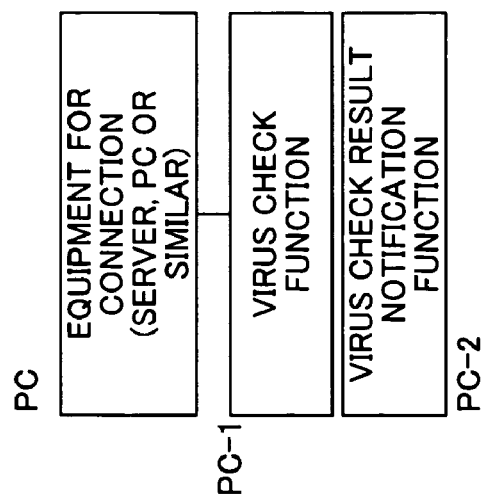
FIG. 7A, FIG. 7B, and FIG. 7C explain functions in application of this invention to a virus monitoring server 2, connection device 1, and equipment for connection PC, as a first aspect.
Figure 7B:
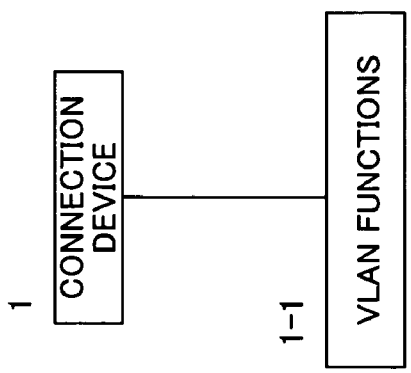
Figure 7A:
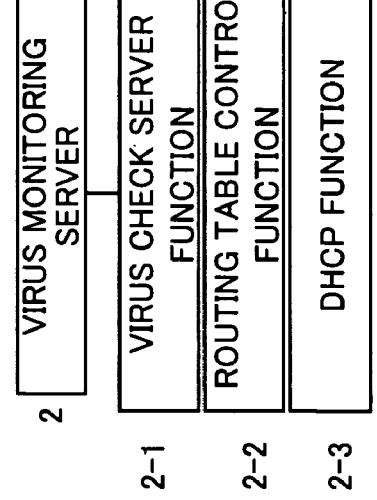

FIG. 7 explains functions in application of this invention to a virus monitoring server 2, connection device 1, and equipment for connection PC, as a first aspect. That is, the virus monitoring server 2 shown in FIG. 7A has virus check server functions 2-1, routing table control functions 2-2, and DHCP (Dynamic Host Configuration Protocol) functions 2-3. The connection device 1 shown in FIG. 7B has VLAN (Virtual Local Area Network) functions 1-1.

The equipment for connection PC shown in FIG. 7C has virus check functions PC-1, and virus check result notification functions PC-2. The virus check functions PC-1 and virus check result notification functions PC-2 in this equipment for connection PC may also be downloaded from the virus monitoring surface 2 at the time of connection.

Returning to FIG. 6A and FIG. 6B in the explanation, the virus monitoring server 2 uses telnet or other means to collect VLAN setting information (port numbers, VLAN names, VLAN IDs, accommodating IP addresses) from the connection device 1 (processing process P1).

An example of the format of packets for this case appears in FIG. 8. An application program (VLANINF) which collects VLAN management table information issues a request (using the REQUEST packet of FIG. 8A) for VLAN management table information to the connection device 1 from the virus monitoring server 2, and in response, the management table information is provided to the virus monitoring server 2 from the connection device 1 through a response packet (using the ANS packet of FIG. 8B).

In this way, VLAN setting information for the connection device 1 obtained from the connection device 1 is collected, and the server management table (see FIG. 9B) of the virus monitoring server 2 is updated (processing process P2).

Here, the management table set in the connection device 1 and virus monitoring server 2 is explained.

FIG. 9 shows an example of a management table in the connection device 1 (FIG. 9A) and an example of a management table in a virus monitoring server 2 (FIG. 9B). From FIG. 9, 10 PCs are already connected to port numbers 1 to 10 of the connection device 1, to form a VLAN1 network group. The port numbers 11 to 16 can be understood to be open ports.

In FIG. 9A and FIG. 9B, port numbers 4 to 9, not shown, have the same setting as port number 1, and port numbers 14 and 15 have the same settings as port number 11.

Figure 2:
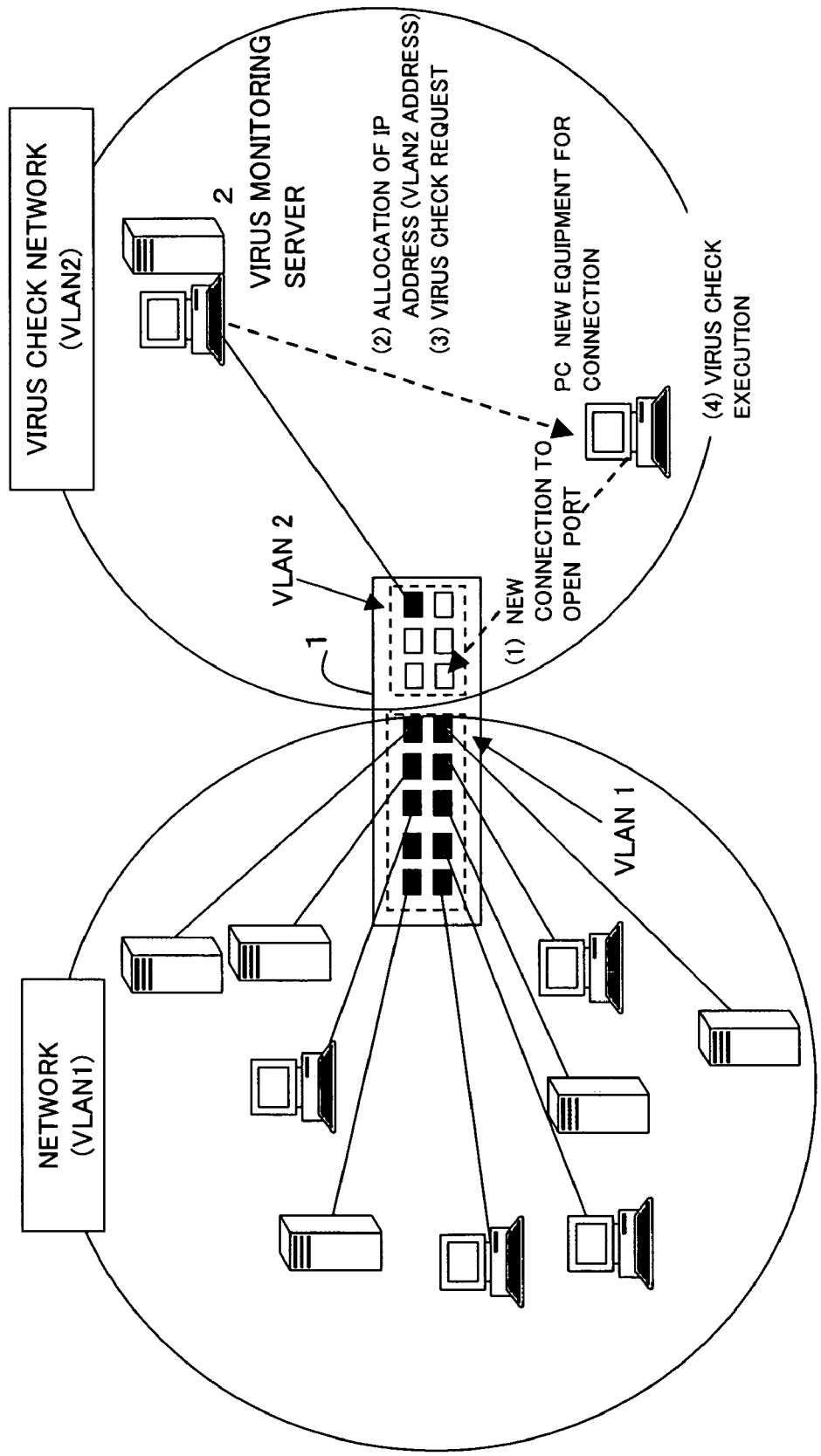
FIG. 2 through FIG. 5 show aspects for cases in which a server, PC or other equipment for connection (hereafter "equipment of connection PC") is newly connected to a network VLAN1.
Figure 3:
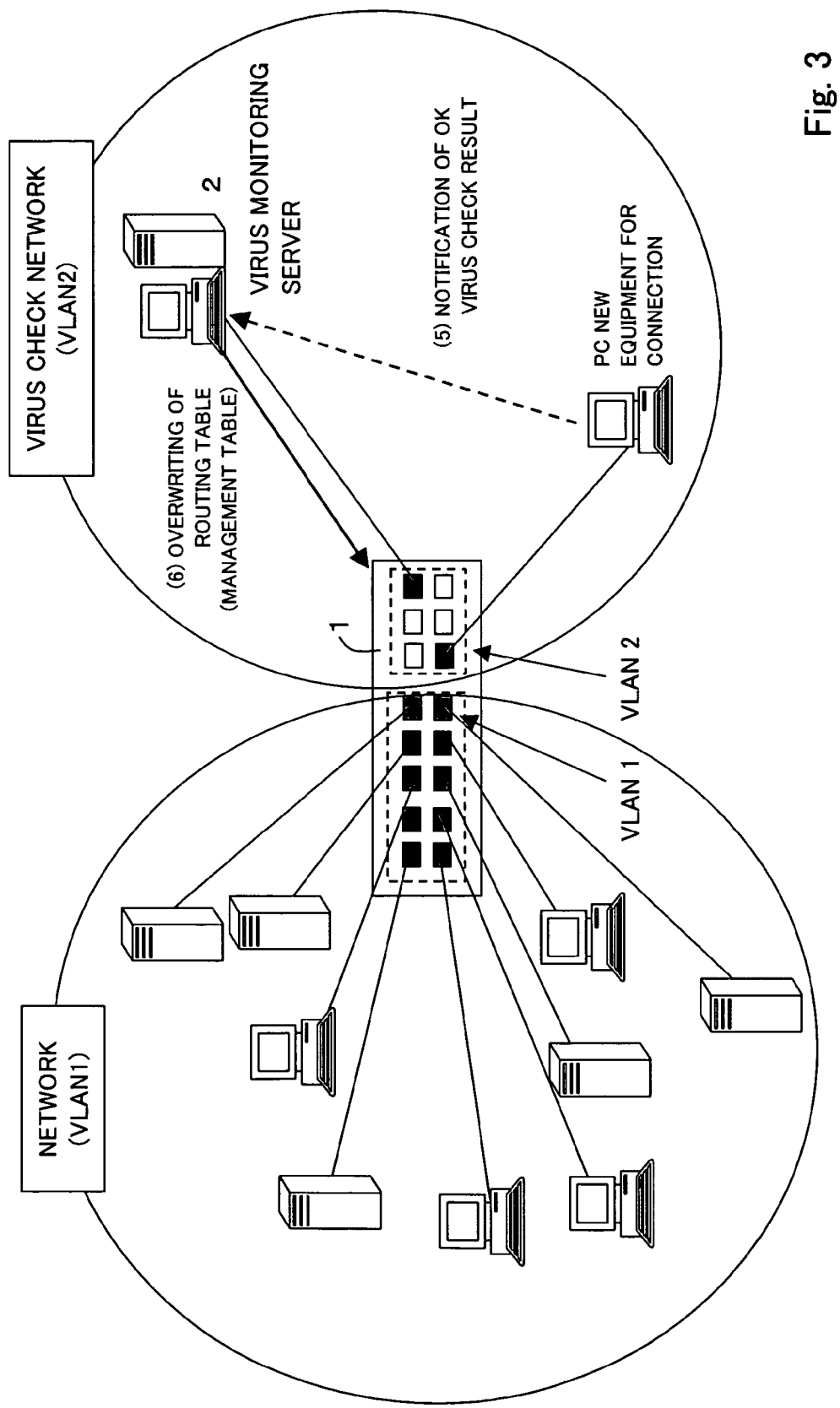
Figure 4:
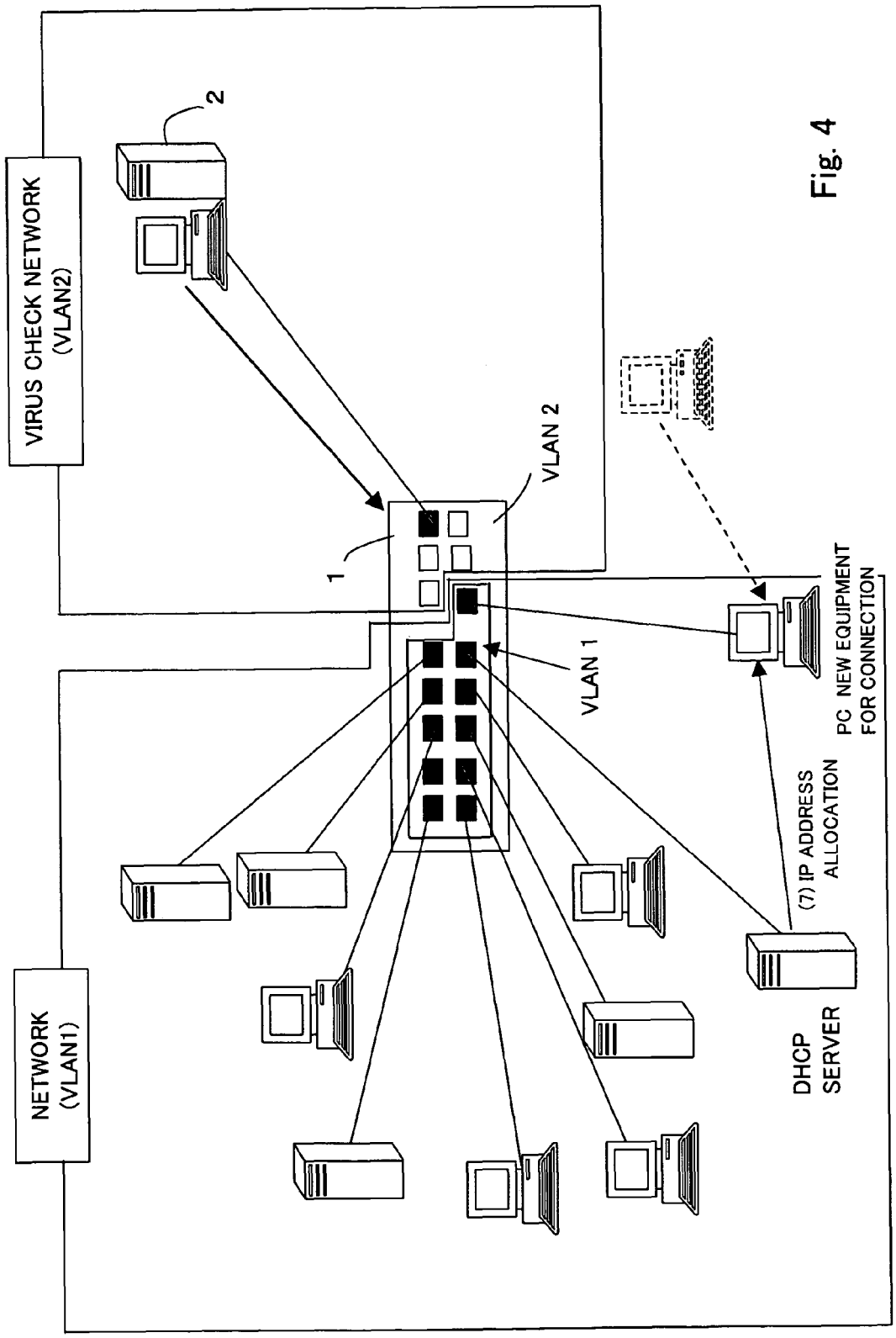
Figure 5:
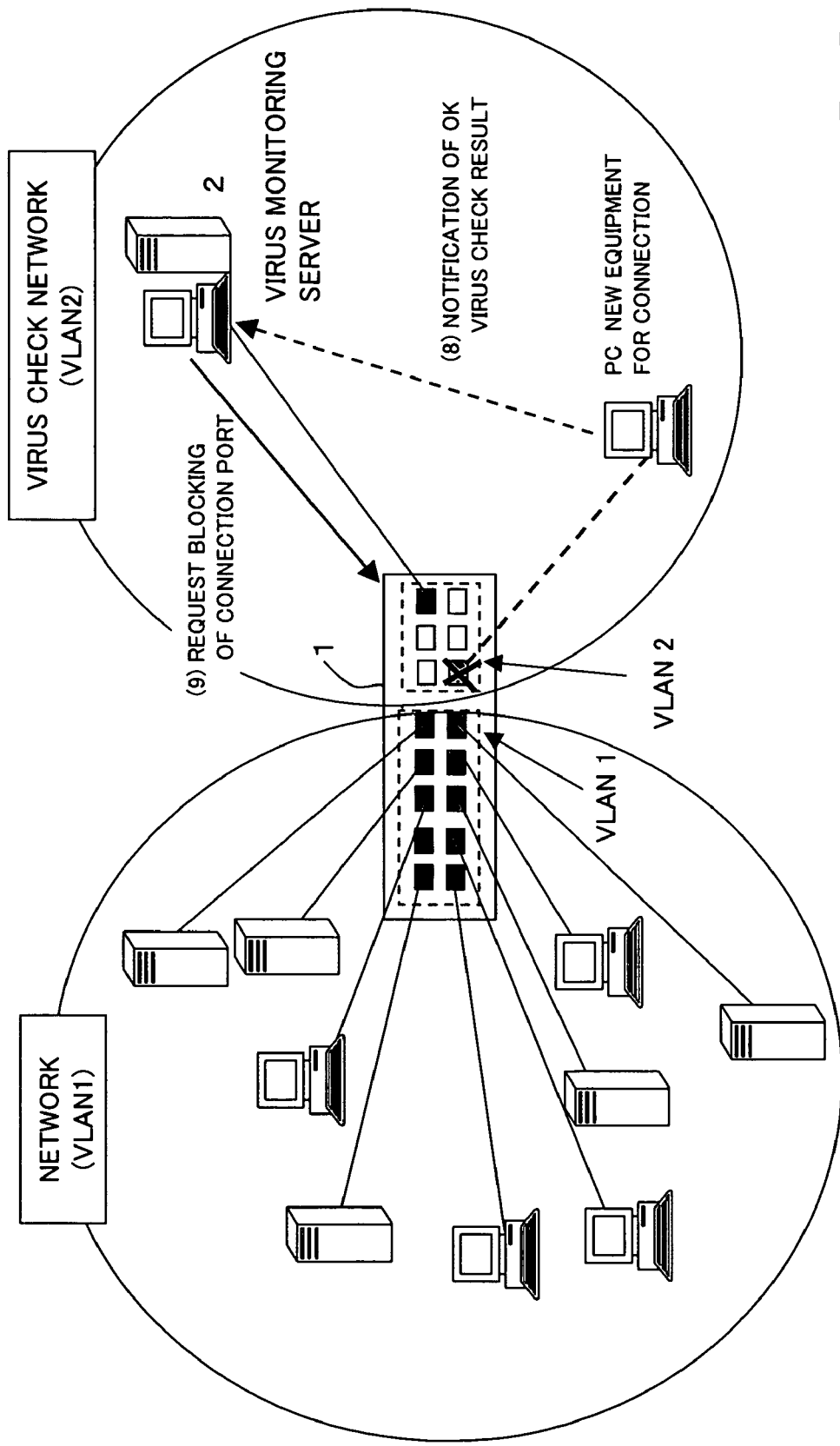

In this state, suppose that equipment for connection PC, to be newly connected to an open port, is accommodated by the VLAN1 (see port number 12 in FIG. 9A). As shown in FIG. 2, when the new equipment for connection PC is inserted into an open port of the connection device 1 (processing process P3, (1) in FIG. 2), the connection device 1 detects connection of a cable to the open port, and notifies the virus monitoring server 2 of the connected port number by means of UDP (User Datagram Protocol), SNMP (Simple Network Management Protocol), SNMPv2Trp, or another protocol (processing process P4).

The equipment for connection PC broadcasts an IP address request by means of DHCP (Dynamic Host Configuration Protocol) (processing process P5). Upon receiving the IP address request, the virus monitoring server 2 allocates an IP address (processing process P6; (2) in FIG. 2), and by this means a connection is subsequently established between the equipment for connection PC and the virus monitoring server 2 (processing process P7).

When the connection is established, a virus check request is sent from the virus monitoring server 2 to the equipment for connection PC by a VirusCHK application program, which performs computer virus checks (processing process P8; (3) in FIG. 2). Hence the equipment for connection PC performs the virus check (processing process P9; (4) in FIG. 2), and notifies the virus monitoring server 2 of the results (processing process P10; (5) in FIG. 3).

Figure 10A:
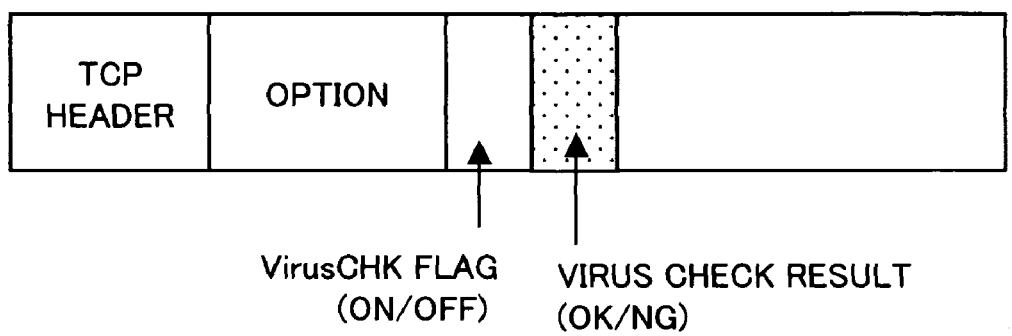
FIG. 10A and FIG. 10B show a virus check request packet and a virus check result notification packet.
Figure 10B:
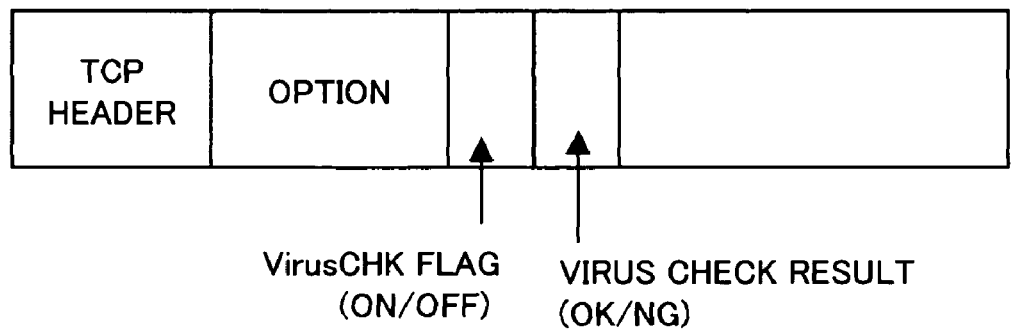

Embodiments of the virus check request from the virus monitoring server 2 and of the virus check result notification from the equipment for connection PC at this time are shown in FIG. 10, as the virus check request packet (FIG. 10A; VirusCHK flag set to ON) and the virus check result notification packet (FIG. 10B; virus check result of OK or NG). As explained above, programs to realize the virus check function and virus check result notification in the equipment for connection PC can be supplied by downloading from the virus monitoring server 2 as necessary.

In FIG. 6B, when there is no problem with the virus check result as notified by the equipment for connection PC (processing process P11, OK), a request to update the management table is sent to the connection device 1 (processing process P12; (6) in FIG. 3).

By this means, as shown in FIG. 11, the management table in the connection device 1 (FIG. 11A) and the management table in the virus monitoring server 2 (FIG. 11B) are both updated (processing processes P13, P14). In FIG. 11A and FIG. 11B, the port numbers 4 to 9, not shown, have the same settings as port number 1, and the port numbers 14 and 15 have the same settings as port number 11.

When the management tables are updated, IP address allocation is performed by a DHCP server for the VLAN1 (see FIG. 4) (processing process P15). By this means, the equipment for connection PC, newly connected to port 6, is accommodated by the network of the VLAN1 (processing process P16).

On the other hand, when in FIG. 6B there are problems with the virus check result as notified by the equipment for connection PC (processing process P11, NG), the connection port is subjected to quarantine (isolation) processing (processing process P17).

As shown in FIG. 12, the management table in the connection device 1 (FIG. 12A) and the management table in the virus monitoring server 2 (FIG. 12B) are each updated accordingly (processing processes P18, P19). In FIG. 12A and FIG. 12B, the port numbers 4 through 9, not shown, have the same settings as port number 1, and port numbers 14 and 15 have the same settings as port number 11.

The equipment for connection PC is quarantined (isolated) in an area separate from both VLAN1 and VLAN2 (processing process P20).

Figure 13:
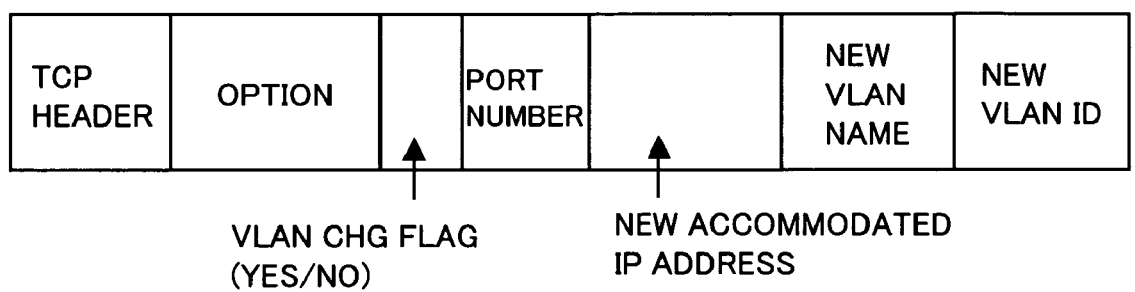
FIG. 13 shows an example of a packet specifying a management table update request and connection port quarantine.

As embodiments of the management table update requests and connection port quarantine process in the above processing process P12 and P17, packets such as that shown in FIG. 13 are used. In FIG. 13, when the virus check result is OK the VLANCHG flag is set to "Yes" to update the VLAN information, and when the virus check result is NG the VLANCHG flag is set to "NO" to block the port.

Figure 14A:
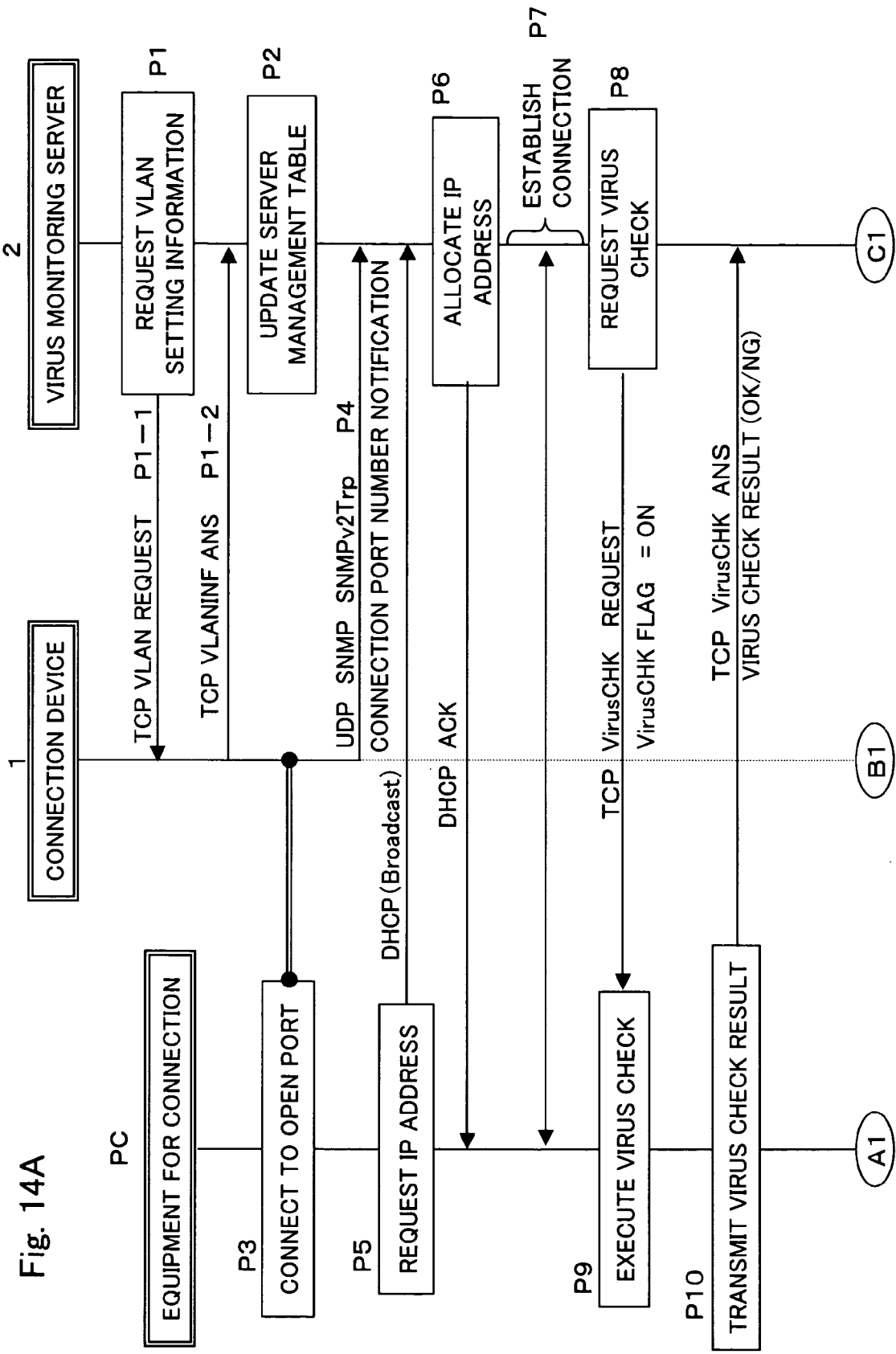
FIG. 14A and FIG. 14B explain the procedure for processing in a second aspect of the invention; and, FIG. 15A, FIG. 15B, and FIG. 15C explain functions in application of this invention to a virus monitoring server 2, connection device 1, and equipment for connection PC, in a second aspect.
Figure 14B:
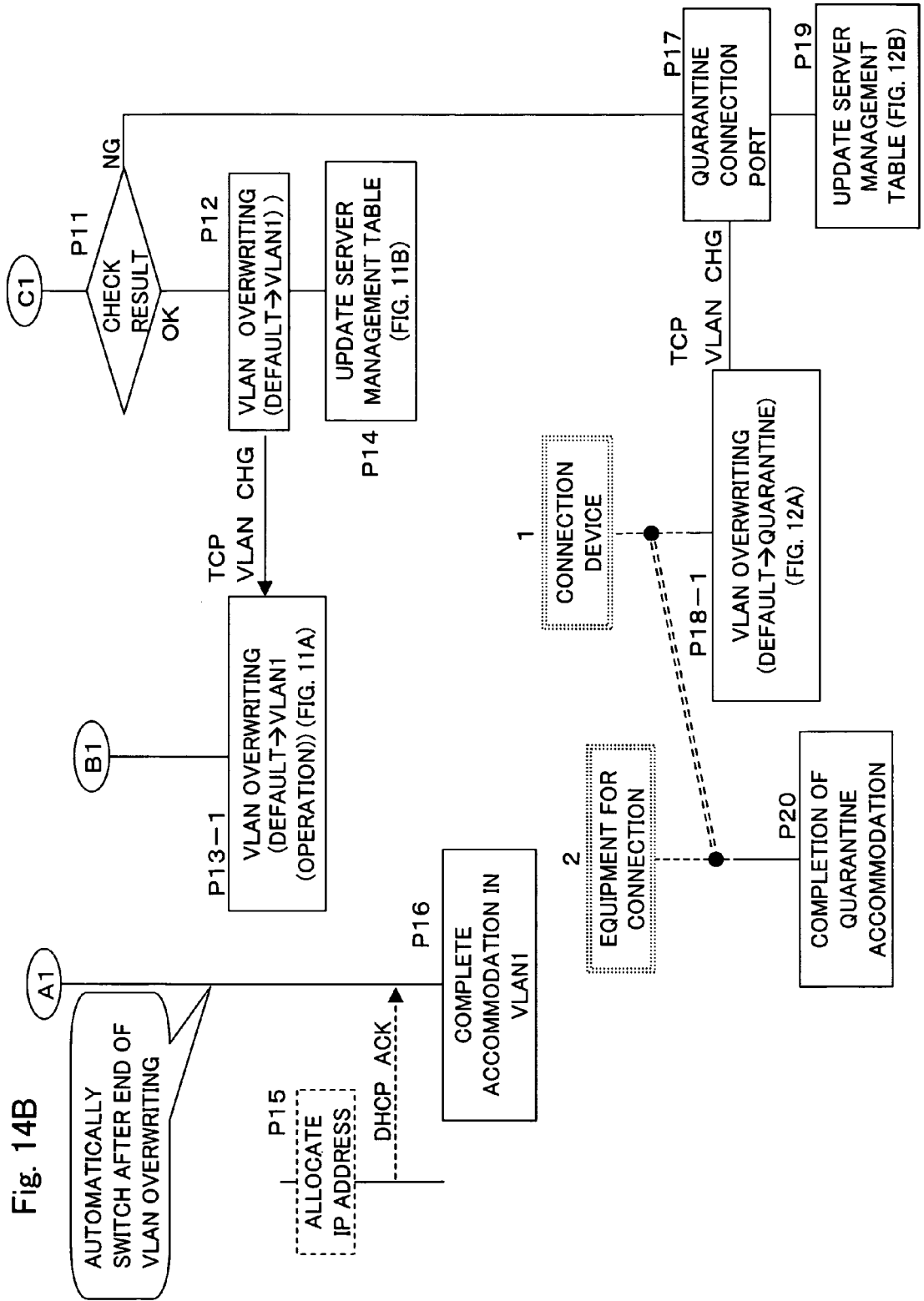
Figure 15C:
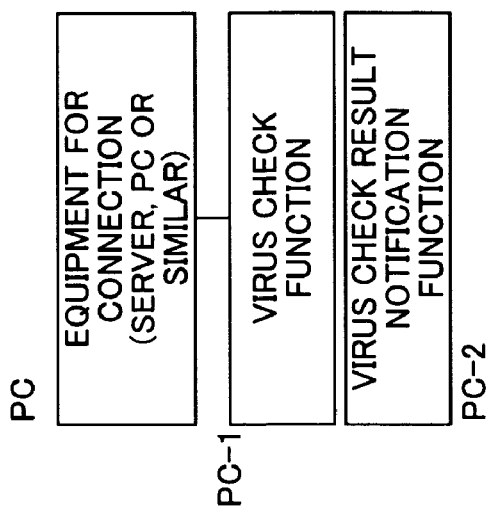
Figure 15B:
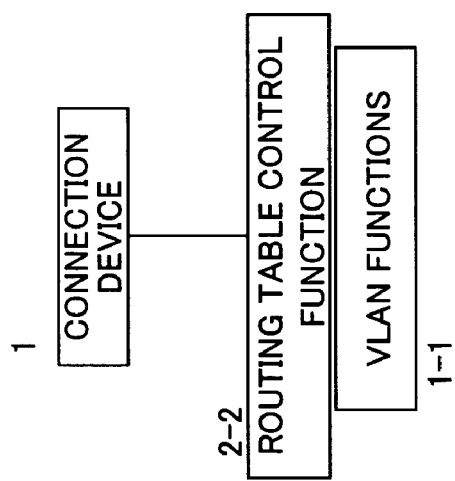
Figure 15A:
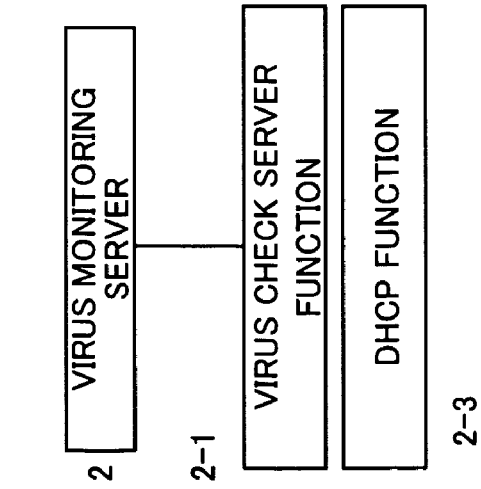

FIG. 14A and FIG. 14B explain the procedure for processing in the second aspect of the invention. FIG. 15 explains functions in application of this invention to a virus monitoring server 2, connection device 1, and equipment for connection PC, in the second aspect.

In FIG. 15, as is clear from comparison with FIG. 7, in the second aspect the connection device 1 further comprises a routing table control function. By this means, the procedure for the processing shown in FIG. 14A and FIG. 14B differs from the procedure for the processing of FIG. 6A and FIG. 6B, but the processing processes P2 to P11 are the same as in the first aspect.

Differences are the use of an application program which requests (collects) VLAN information in the virus monitoring server 2 to collect the VLAN information (port numbers, VLAN name, VLAN ID, accommodating port address) from the connection device 1 (processing processes P1-1, P1-2), instead of collecting information by telnet or other means in the processing step P1 shown in FIG. 14A.

The processing processes P2 to P11 are the same as in the first aspect, whereas the processing in processing process P12 and later is different. That is, in the processing process P12 shown in FIG. 14B, instead of sending a VLAN management table update request to the connection device 1 by the virus monitoring server 2 (processing process P12; (6) in FIG. 3), an application program which perform VLAN overwriting (updating of LAN port accommodation, port blocking) is used to set the VLAN modification flag to "Yes" and issue notification of the port number, VLAN name, VLAN ID, and new accommodation IP address by means of a packet such as that in FIG. 13 (processing process P12). By this means, the newly accommodated IP address, VLAN name, and VLAN ID settings are overwritten by the routing table control function 2-2 of the connection device 1, and the newly connected equipment is accommodated by the VLAN1 to enable operation (processing process P13-1).

Similarly when the virus check result is NG, the packet of FIG. 13 is used to set the VLAN modification flag to "NO" and issue notification of the port number, VLAN name, VLAN ID, and newly accommodated IP address (processing process P17). By this means, VLAN overwriting to quarantine is performed in the connection device 1 (processing process P18-1).

In the above, when the equipment for connection PC is removed from the port of the network connection device 1 belonging to the VLAN1, the network connection device 1 accommodates the port in VLAN2, that is, accommodates the equipment for connection PC using a virus check port.

INDUSTRIAL APPLICABILITY

As explained above, in this invention it is possible to prevent spreading over an entire network of a virus resulting from connection to the network of a server, client, PC or other equipment infected with a virus, so that a network which is resilient to computer viruses can be configured.

What is claimed is:

1. A method for connection of equipment to a network, comprising:
    separating network configuration of the network into an operation network associated with a first VLAN (Virtual Local Area Network) identifier and a virus check network associated with a second VLAN identifier, which is different from the first VLAN identifier;
    at the time of connection of equipment, associating a packet from the equipment to the second VLAN identifier and performing a virus check in the virus check network;
    associating a packet from the equipment to the first VLAN identifier; and
    accommodating the equipment, to the operation network, if the equipment has been confirmed to be safe through the virus check.

2. The method for connection of equipment to a network according to claim 1,
    further comprising the step of isolating the equipment from both the operation network and the virus check network, when confirmation of safety through said virus check is not possible.

3. A network system, comprising:
    a network connection device, having a plurality of ports, at least one port of which is connected to an operation network associated with a first VLAN identifier, and at least another port of which is connected to a virus check network associated with a second VLAN identifier different from the first VLAN identifier; and
    a virus check server, connected to the virus check network, wherein when new equipment is connected to an open port of the network connection device, a packet from the new equipment is associated with the second VLAN identifier to perform a virus check for the new equipment; and, when safety is confirmed through said virus check, a packet from the new equipment is associated with the first VLAN identifier.

4. The network system according to claim 3, wherein when confirmation of safety through the virus check is not possible, the new equipment is isolated from both the operation network and the virus check network.

5. The network system according to claim 3, wherein the network connection device comprises management tables for each of the plurality of ports, and the management tables are updated corresponding to the results of the virus check, to update settings of the operation network to accommodate a port to which the new equipment is connected.

6. The network system according to claim 3, wherein when the equipment connected to the operation network is removed from a corresponding port within the plurality of ports, the network connection device changes the corresponding port to be accommodated in the virus check network.

7. A network connection device comprising:

a plurality of ports, at least one port of which is connected to an operation network associated with a first VLAN identifier, and at least another port of which is connected to a virus check network associated with a second VLAN identifier different from the first VLAN identifier, wherein when new equipment is connected to an open port of the network connection device, the network connection device associates a packet from the new equipment with the second VLAN identifier to perform a virus check for the new equipment by a virus check server; and, when safety is confirmed through the virus check, the network connection device associates a packet from the new equipment with the first VLAN identifier.

* * * * *